June 20, 1933.     C. G. EDEN ET AL     1,914,634
MANUFACTURE OF ELECTRIC DISCHARGE VESSELS
Filed Feb. 17, 1932
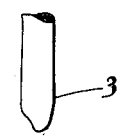
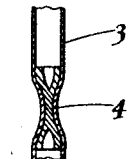
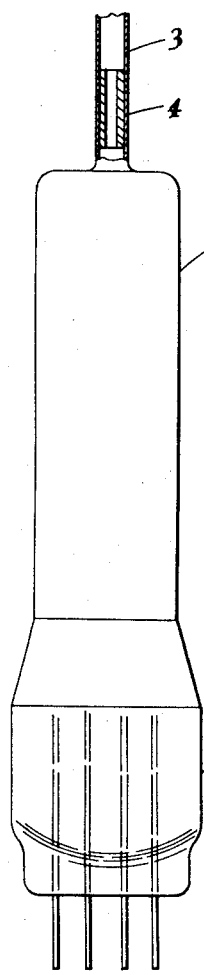
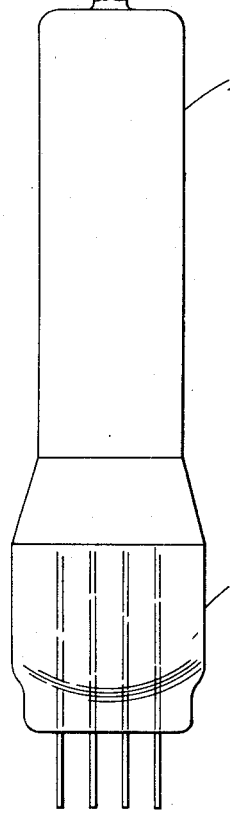
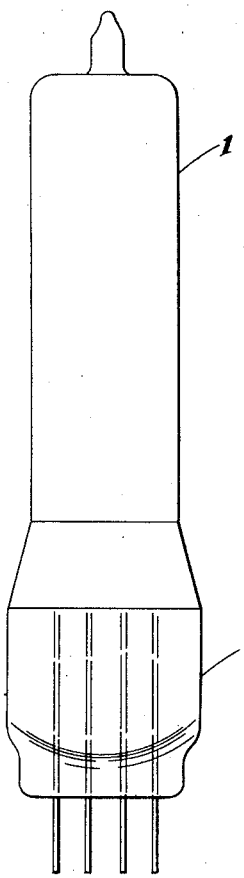
INVENTOR
Christopher G. Eden
and Colin J. Smithells
BY
*M. H. Lockwood*
ATTORNEY Patented June 20, 1933

1,914,634

UNITED STATES PATENT OFFICE

CHRISTOPHER GABRIEL EDEN, OF CROXLEY GREEN, AND COLIN JAMES SMITHELLS, OF BUSHEY, ENGLAND, ASSIGNORS TO THE M-O VALVE COMPANY LIMITED, OF LONDON, ENGLAND

MANUFACTURE OF ELECTRIC DISCHARGE VESSELS

Application filed February 17, 1932, Serial No. 593,446, and in Great Britain February 19, 1931.

This invention relates to methods of sealing off from the exhaust pump electric discharge vessels of the kind in which one of the metal electrodes forms part of the envelope of the vessel.

The manufacture of an electric discharge vessel of the kind specified, according to the present invention, comprises exhausting the vessel through a metal tube attached to the metal part of the envelope, the said tube being coated internally with solder prior to exhaustion, compressing and heating the tube so that the solder melts and forms a continuous layer blocking the bore of the tube, and finally severing the tube beyond the block so formed. It is to be understood that by solder is meant a metal alloy that wets the tube and melts at a lower temperature than the tube.

The invention will now be described, by way of example, with reference to the accompanying drawing, which shows various stages in the manufacture of a broadcast receiving valve.

As shown in Figure 1, the envelope of the valve comprises a copper portion 1, which forms the anode, and a lower glass portion 2. The copper anode 1 is of cylindrical form and is provided at one end with a copper tube 3. This tube 3 may be formed either by drawing off the top of the anode 1 or a separate tube may be brazed to the end of the anode. The tube 3 is coated internally with a layer of silver solder 4.

When the internal parts of the valve have been assembled and the end of the glass portion 2 has been sealed off, the envelope is exhausted through the tube 3. When exhaustion is complete the tube 3 is compressed, as shown in Figure 2, to constrict the bore of the tube adjacent to the solder 4 and the tube is heated until the solder melts and forms a continuous layer blocking the constricted bore of the tube. Finally the tube is cooled and the portion of the tube beyond the blocked part is detached, as shown in Figure 3, in any convenient manner. If desired the solder may be melted before the tube is compressed or the two operations may be performed simultaneously.

We claim:—

1. In the manufacture of an electric discharge vessel of the kind specified, the process which comprises providing the metal part of the envelope with a metal tube projecting from the envelope, coating the tube internally with solder at a point adjacent to the envelope, exhausting the envelope through the tube, compressing the tube upon the solder at the point coated and melting said solder so that it blocks the compressed part of the tube.

2. In the manufacture of an electric discharge vessel of the kind specified, the process which comprises providing the metal part of the envelope with a metal tube projecting from the envelope, coating the tube internally with solder at a point adjacent to the envelope, exhausting the envelope through the tube, heating the tube to melt the solder and compressing the tube upon the solder at the point coated so that the tube is blocked by the melted solder.

3. In the manufacture of an electric discharge vessel of the kind specified, the process which comprises drawing off the end of the metal part of the envelope to form a tube extending from the envelope, coating the interior of that part of the tube which is adjacent to the envelope with solder, exhausting the envelope through the tube and closing the tube by compressing it upon and melting the solder.

4. In the manufacture of an electric discharge vessel in which a cylindrical copper anode forms part of the envelope of the vessel, the process which comprises providing the anode with a metal tubular extension, coating the interior of the extension with solder, exhausting the envelope through the extension and closing the extension by compressing it upon and melting the solder.

5. A sealed electric discharge vessel comprising a metal anode forming part of the envelope, a metal exhaust tube extending from said anode, the end of which is compressed, and solder within the compressed portion of the tube sealing the same.

CHRISTOPHER GABRIEL EDEN.
COLIN JAMES SMITHELLS.